United States Patent [19]
Daoud

[11] Patent Number: 5,929,381
[45] Date of Patent: Jul. 27, 1999

[54] SIGNAL TRANSMISSION MEDIA ROUTING ARRANGEMENT WITH RECTANGULAR DISTRIBUTION RINGS

[76] Inventor: Bassel Hage Daoud, 100 Vail Rd., Parsippany, N.J. 07054

[21] Appl. No.: 08/932,147

[22] Filed: Sep. 17, 1997

Related U.S. Application Data

[63] Continuation of application No. 08/718,855, Sep. 24, 1996, abandoned, which is a continuation-in-part of application No. 08/666,708, Jun. 18, 1996, abandoned.

[51] Int. Cl.⁶ .................................................. H02G 3/00
[52] U.S. Cl. ........................ 174/72 A; 361/826; 439/719; 174/135
[58] Field of Search ........................... 174/135, 60, 72 A, 174/72 C, 65 R; 439/709, 715, 716, 719; 361/826, 827; 379/325, 326, 327

[56] References Cited

U.S. PATENT DOCUMENTS

| | | | |
|---|---|---|---|
| 3,966,074 | 6/1976 | Hotchkiss et al. | 220/3.8 |
| 4,131,934 | 12/1978 | Becker et al. | 361/827 |
| 4,371,757 | 2/1983 | Debortoli et al. | 174/60 |
| 4,575,169 | 3/1986 | Duplatre et al. | 439/142 |
| 4,588,153 | 5/1986 | Boston et al. | 248/74.2 |
| 4,729,059 | 3/1988 | Wang | 361/657 |
| 4,752,107 | 6/1988 | Gunell et al. | 439/709 |
| 4,967,924 | 11/1990 | Murofushi et al. | 220/3.8 |
| 5,115,377 | 5/1992 | Dransman | 361/823 |
| 5,276,279 | 1/1994 | Brownlie et al. | 174/65 R |
| 5,378,174 | 1/1995 | Brownlie et al. | 439/709 |
| 5,425,518 | 6/1995 | Czerniak | 248/67.5 |
| 5,531,345 | 7/1996 | Nakamura et al. | 220/3.8 |
| 5,700,163 | 12/1997 | Okabe | 439/596 |

OTHER PUBLICATIONS

AMP Instruction Sheet IS 7555, product No. 207467, pp. 1–3, Aug. 1988.
AMP Product Guide, Catalogue 82750, p. 2202, Jun. 1991.

*Primary Examiner*—Kristine Kincaid
*Assistant Examiner*—Dhiru R Patel

[57] ABSTRACT

An arrangement for routing filamentary signal transmission elements terminated at an output wire connector field enclosed within a housing. The housing has a base wall for mounting to a support surface and a plurality of substantially planar surrounding walls each substantially perpendicular to the base wall so as to define an open enclosure. The routing arrangement has a trough frame adapted for surrounding a plurality of filamentary signal transmission elements and support structure associated with at least one of the surrounding walls for supporting the trough frame within the plane of that wall so that a plurality of filamentary signal transmission elements terminated at the connector field can be guided by the trough frame to exit the housing through that surrounding wall.

6 Claims, 3 Drawing Sheets

SIGNAL TRANSMISSION MEDIA ROUTING ARRANGEMENT WITH RECTANGULAR DISTRIBUTION RINGS

This application is a continuation of application Ser. No. 08/718,855, filed Sep. 24, 1996, now abandoned, which is a continuation-in-part of application Ser. No. 08/666,708, filed Jun. 18, 1996 now abandoned.

BACKGROUND OF THE INVENTION

This invention relates to a signal transmission media routing arrangement for use with a housing holding a media connector field.

Where telephone wires enter a building, there is usually provided a building entrance protector (BEP) box. The incoming wires, which are typically contained within one or more multi-wire cables, enter a splice chamber in the box, where they are connected to short wires which go to a protector field within the BEP box providing protection against lightning, high voltage and high current, and then connections are made to an output wire connector field. At the connector field, connections are made to wires which extend through the building to output jacks at various locations in the building. The wires leaving the connector field are formed into bundles which are routed out of the box and through the building.

Typically, each BEP box is mounted on a substantially vertical surface. However, a single BEP box can only handle a limited number of wires. In a large building, it may be necessary to have several BEP boxes. In such case, the boxes are usually stacked vertically on the mounting surface and the bundle of wires leaving each box is routed through all of the boxes beneath it. Therefore, if three or four boxes are stacked, by the time the bundle of wires leaves the lowest box, the bundle is large and tightly packed. In the event there is a problem with a wire, it is very difficult for a technician to trace the wire through its bundle back to its originating BEP box. If that wire has to be replaced, this is also very difficult. Accordingly, there is a need for a wire routing arrangement in conjunction with a BEP box to give the installer flexibility in the routing of wire bundles so that the size of the bundles can be maintained at a manageable level. There is also a need for a wire routing arrangement which allows the installer to selectively change an individual wire in a bundle. There also exists a need for a wire routing arrangement which allows the installer to change the direction of routing of a wire bundle without disconnecting all of the wires from the connector field.

Where fiber optic cables enter a building, a building entrance box is provided within which the cables are spliced to individual fibers which lead to one side of a connector field. From the other side of the connector field, other individual fibers are formed into bundles which are routed throughout the building, in the same manner as the afore-described wires. Accordingly, the same needs exist for a routing arrangement for optical fibers as were described above for wires.

Wires and optical fibers are both filamentary signal transmission elements. They therefore share a number of common attributes—for example, individual elements can be bundled into cables for routing throughout a building. Accordingly, it would be economically advantageous to provide routing arrangements for both wires and optical fibers (as well as other filamentary elements) which utilize as many common components as possible.

SUMMARY OF THE INVENTION

The present invention is an arrangement for routing filamentary signal transmission elements terminated at an output connector field disposed within a housing. The housing has a base wall adapted for mounting to a support surface and a plurality of substantially planar surrounding walls each substantially perpendicular to the base wall so as to define an open enclosure. The inventive routing arrangement comprises a trough frame adapted for surrounding a plurality of filamentary signal transmission elements, and support means associated with at least one of the surrounding walls for supporting the trough frame within the plane of that wall so that a plurality of filamentary signal transmission elements terminated at the connector field can be guided by the trough frame to exit the housing through that surrounding wall.

In accordance with an aspect of this invention, the trough frame is a four-sided generally planar frame surrounding an open region with one of the sides of the frame having an opening for selectively allowing a filamentary signal transmission element to be transversely inserted into or extracted from the open region. The at least one surrounding wall is cut away so as to have a respective three-sided open notch and the support means includes a pair of channels in the periphery of the notch each adapted to receive a respective one of a pair of opposed sides of the frame adjacent to the one side having the opening so as to retain the trough frame in substantially coplanar relation to the surrounding wall while exposing the frame side having the opening.

BRIEF DESCRIPTION OF THE DRAWINGS

The foregoing will be more readily apparent upon reading the following description in conjunction with the drawings in which like elements in different figures thereof are identified by the same reference numeral and wherein.

DETAILED DESCRIPTION

Figure 1:
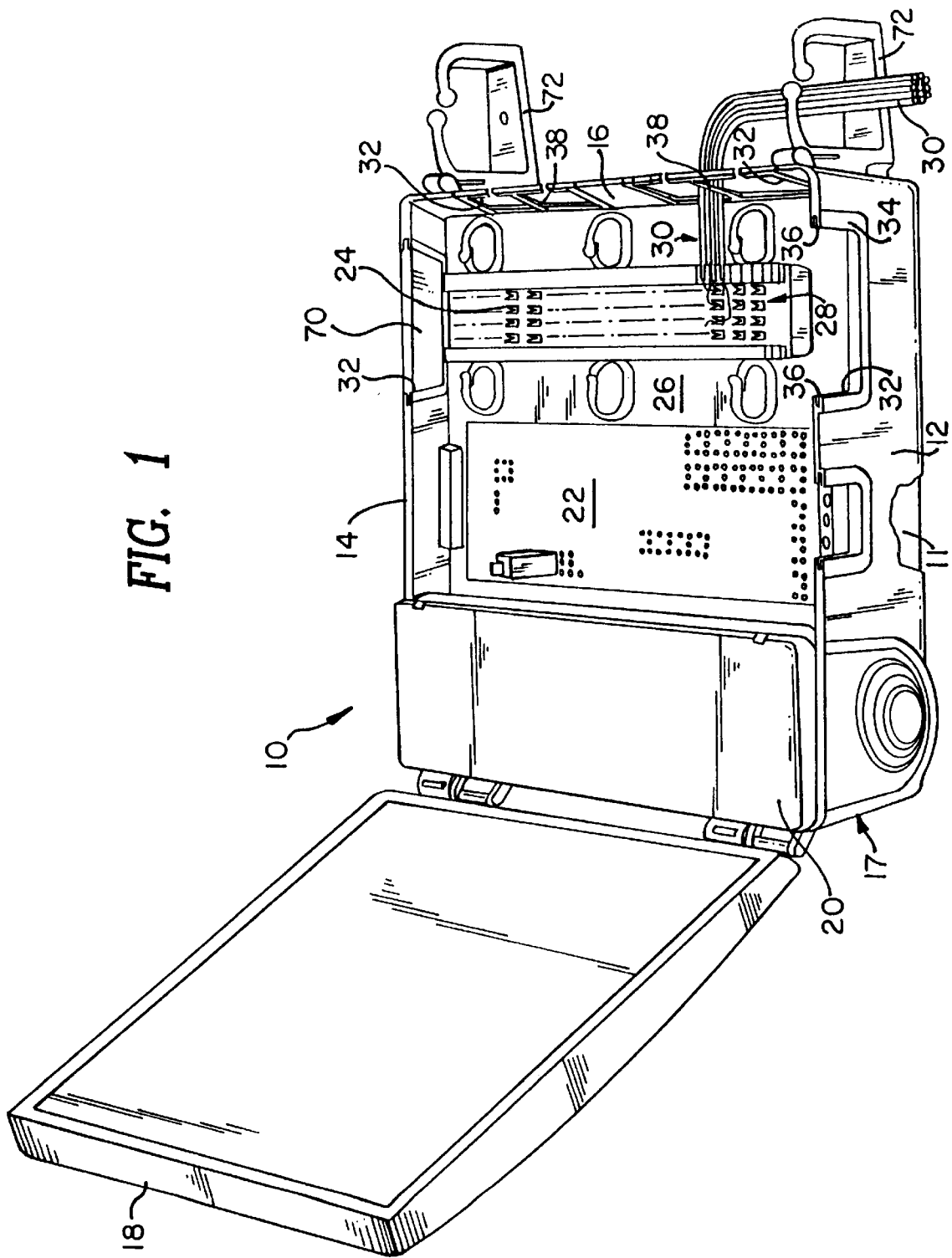
FIG. 1 is a perspective view of a building entrance protector box for use with electrical wires and constructed in accordance with the principles of this invention to include an improved routing arrangement.

Referring now to the drawings, FIG. 1 illustrates a building entrance protector box, designated generally by the reference numeral 10, and constructed in accordance with the principles of this invention to incorporate an improved wire routing arrangement. The box 10 has a base wall 11 adapted for mounting to a support surface, typically substantially vertically oriented, and a plurality of substantially planar surrounding walls each substantially perpendicular to the base wall. These surrounding walls include a lower wall 12, an upper wall 14, a first side wall 16 and a second side wall 17 opposite the first side wall 16. Thus, the base wall 11 together with the surrounding walls 12, 14, 16, 17 define an open enclosure. A cover 18 hingedly mounted to the side wall 17 closes off the open enclosure.

The open enclosure of the box 10 includes three main sections. The first section is the splice chamber beneath the cover member 20. The second section is the protector field 22. The third section is the output wire connector field 24. These sections are well understood in the art and only a brief discussion of their functions will be given herein.

Telephone wires, typically contained in multi-wire cables (not shown), which enter the building are routed to the splice chamber. Protector blocks for providing lightning, high voltage and high current protection are installed in the protector field 22. Within the splice chamber, the wires from the outside are connected to short wires (not shown) leading to one side of respective ones of the protector blocks in the protector field 22. Wires (not shown) connected to the other side of the protector blocks are then routed, below the surface 26, to the output wire connector field 24. The connector field 24 includes an array of generally planar insulation displacing connector terminals 28. The terminals 28 are positioned along lines which are substantially parallel to the side wall 16. Wires 30 which extend throughout the building are terminated at the terminals 28.

According to the present invention, the wires 30 terminated at the connector field 24 can be selectively routed out of the box 10 either through the lower wall 12, the upper wall 14 or the side wall 16. Toward that end, each of the walls 12, 14, 16 is formed with at least one three-sided open notch 32, shown in its entirety in the wall 12. The wall around the periphery of the notch 32 is thickened, as shown at 34, to accommodate a pair of channels 36 which are formed in the two opposed sides of the notch 32.

Figure 2:
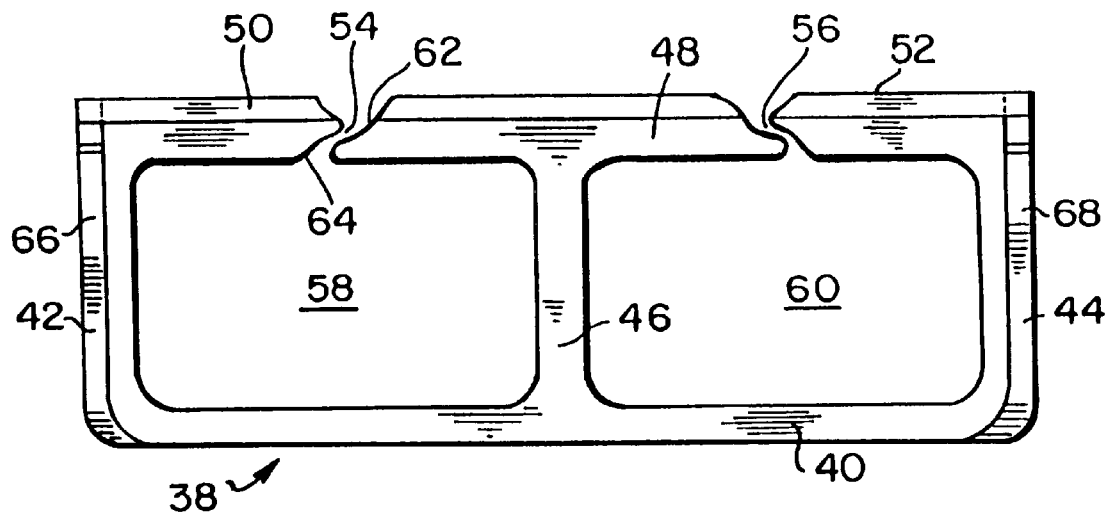
FIG. 2 is an elevational view of a trough frame adapted for installation in a wall of the box of FIG. 1.

To hold the wires 30 in place while they pass through a selected one of the walls 12, 14, 16, a trough frame, designated generally by the reference numeral 38 and best shown in FIG. 2, is provided for installation into a selected one of the notches 32. Thus, the trough frame 38, which is preferably integrally molded as a generally planar unitary plastic piece, includes a lower frame member 40, a pair of side frame members 42, 44 and a central frame member 46. The side frame members 42, 44 are secured to opposite ends of the lower frame member 40 and extend orthogonally thereto. The central frame member 46 is secured to the lower frame member 40 substantially midway between the ends of the lower frame member 40 and extends parallel to the side frame members 42, 44. The distal ends of the frame members 42, 44, 46 are equidistant from the lower frame member 40 and define a line parallel to the lower frame member 40.

Secured to the central frame member 46 is a first resilient upper frame member 48. The upper frame member 48 is secured at a central region to the distal end of the central frame member 46 and extends parallel to the lower frame member 40, ending approximately midway between the central frame member 46 and each of the side frame members 42, 44. Second and third resilient upper frame members 50, 52, respectively, are secured to the distal ends of the side frame members 42, 44, respectively, and extend parallel to the lower frame member 46, each toward the first upper frame member 48 to define two open regions 58, 60. The three upper frame members 48, 50, 52 are substantially co-linear with each other and parallel to the lower frame member 40. So that when the trough frame 38 is installed in the notch 32, the upper frame members 48, 50, 52 are aligned with upper edge of the housing side wall, so that when cover 18 is closed, the gaps 54, 56 are blocked.

The ends of the first upper frame member 48 are spaced from the ends of respective ones of the second and third upper frame members 50, 52 so as to form openings, or gaps, 54, 56, communicating with the open regions 58, 60, respectively. The minimum dimension of the gaps 54, 56 is less than the thickness of an individual one of the wires 30. Accordingly, an individual one of the wires 38 can be transversely passed through a selected opening 54, 56 by taking advantage of the resiliency of an upper frame member 48, 50, 52 to increase the minimum dimension of the selected opening 54, 56. The shapes of the distal ends of the upper frame member 48, 50, 52 are such that when, for example, it is desired to insert a wire into the open region 58, the wire is forced against the angled edge 62 and the resiliency of the central frame member 46 and the first upper frame member 48 widens the opening 54 to allow the wire to pass therethrough. Once inside the open region 58, a wire cannot exit of its own accord. However, if it is desired to remove a wire from the open region 58, the wire is forced against the angled edge 64 of the end of the second upper frame member 50 with sufficient force so that the resiliency of the second upper frame member 50 and the side frame member 42 widens the opening 54.

The side frame members 42, 44 have their cross sections so shaped that their outer edges 66, 68, respectively, conform to the size and shape of the channels 36, whereby the trough frame 38 can be slid into a selected notch 32 and maintained within the plane of the associated wall. If a particular notch is not being utilized, a plate member 70, such as is shown filling the notch 32 of the upper wall 14 in FIG. 1, can be installed in a notch to close the notch. The plate member 70 has the same peripheral size and shape as the trough frame 38, with outer lateral edges being complementary to the channels 36, but being solid therebetween without any open regions.

Figure 3:
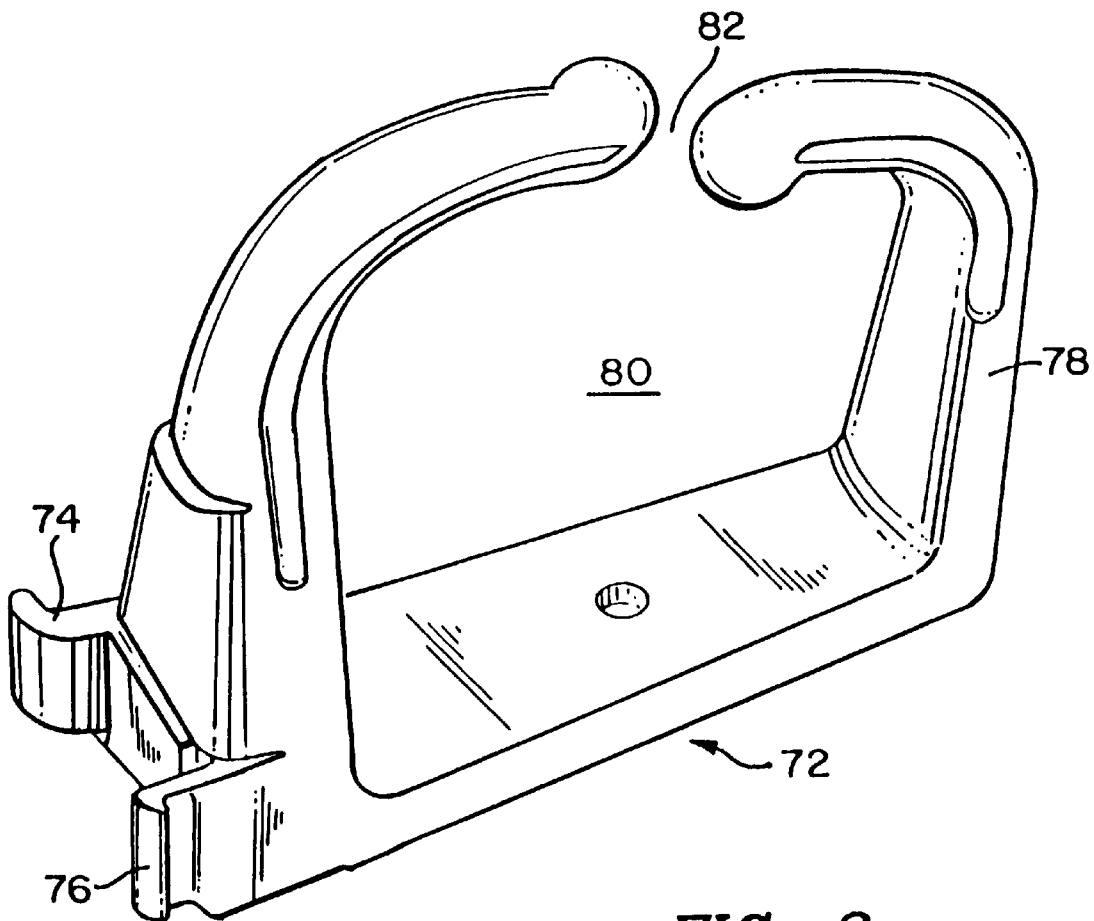
FIG. 3 is a perspective view of an exterior trough.

FIG. 3 illustrates an exterior trough, designated generally by the reference numeral 72. The trough 72 includes a pair of tabs 74, 76 adapted to be snapped into appropriately sized and shaped openings in the exterior of the side wall 16. The trough 72 has a frame 78 surrounding an open region 80, with the frame 78 having an opening 82 for selectively allowing a wire to be transversely inserted into or extracted from the open region 80.

In use, for each particular installation the installer determines whether the wires 30 which are terminated at the output wire connector field 24 are to routed out of the box 10 upwardly, downwardly or laterally. The installer then inserts a trough frame 38 into a selected one or more of the notches 32 and also preferably inserts a plate member 70 into each of the remaining unused notches 32. The wires 30 are then transversely inserted into the open regions 58, 60 of the trough frame 38 and are terminated to respective connector terminals 28. When the cover 18 is closed, the gaps 54, 56 in the trough frame 38 are blocked, therefor, retaining the wire 30 in open regions 58, 60 and preventing connection changes at the connector field. The wires 30 can then be routed alongside the box 10 by being inserted into the open region 80 of an exterior trough 72.

If at a later time some changes need to be made to the wiring, the cover 18 is open and an individual wire can be readily removed from the exterior trough 72 and/or the trough frame 38 and be rerouted, without disturbing the large bundle of wires.

Although the trough frame 38 has been shown with two open regions 58, 60, the size of the frame is what determines the number of open regions. Thus, for example, if the frame is narrower, only one open region may be required. The reason for having two open regions, as shown in FIG. 2, is that the length of the upper frame members 48, 50, 52 should not be too long.

Figure 4:
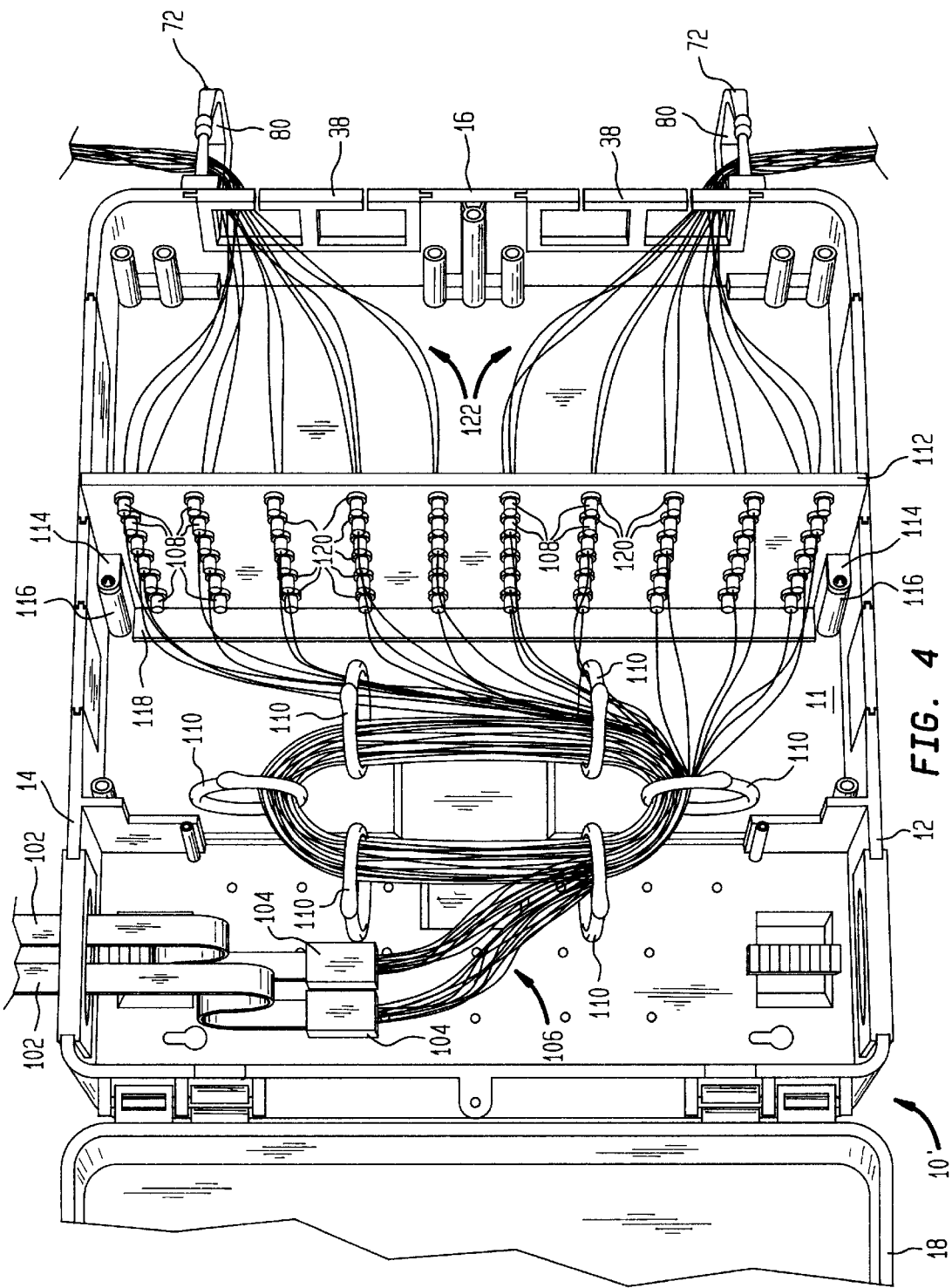
FIG. 4 is a perspective view of a building entrance box for use with optical fibers and constructed in accordance with the principles of this invention to include an improved routing arrangement.

FIG. 4 illustrates a building entrance box, designated generally by the reference numeral 10', which is essentially the same as the box 10 shown in FIG. 1 but which is adapted for use with optical fibers. Thus, the box 10' does not have the cover 20 or the surface 26. A fiber optic cable 102 which enters the box 10' is terminated at a splice box 104 and connected to individual optical fibers 106. The fibers 106 are each terminated by a respective fiber connector 108. To hold the fibers 108 in a slackened condition for storage, a plurality of rings 110 are mounted to the surface 11 in an oval pattern so that the fibers 106 can be inserted therein and looped, as shown.

A connector panel 112 is secured to the box 10' parallel to the wall 16. Illustratively, the panel 112 has a pair of tabs 114 having openings so that headed screws can be passed therethrough and into respective standoffs 116. The bottom of the panel 112 is formed with a flange 118 having double sided tape at its bottom for securing the flange 118 to the surface 11. Connector elements 120 are mounted in suitable apertures of the panel 112, which are illustratively arrayed in a rectangular grid of rows and columns, to form a connector field. The connector elements 120 extend through the panel 112 and are adapted to have secured to their opposite ends respective fiber connectors 108, so that fibers on both sides of the panel 112 can be interconnected with minimum signal transmission loss, as is conventional in the art. Accordingly, the fibers 122 on the right side of the panel 112 are connected to respective ones of the fibers 106 on the left side of the panel 112. As with the wires 30 shown in FIG. 1, the fibers 122 are routed out of the box 10' through the trough frames 38, where they may be inserted into the open region 80 of an exterior trough 72 and then bundled for routing throughout the building.

Accordingly, there has been disclosed an improved signal transmission media routing arrangement for use with a housing holding a media connector field. While illustrative embodiments of the present invention have been disclosed herein, it will be apparent to one of ordinary skill in the art that various modifications and adaptations to the disclosed embodiments are possible and it is intended that this invention be limited only by the scope of the appended claims.

What is claimed is:

1. A signal transmission media routing arrangement comprising:

a housing having a base wall adapted for mounting to a support surface and a plurality of substantially planar surrounding walls each substantially perpendicular to said base wall so as to define an open enclosure, with at least one of said surrounding walls being cut away so as to have a respective three-sided open notch;

a signal transmission media connector field secured to said housing within said open enclosure for connecting individual ones of a first group of filamentary signal transmission elements entering said housing open enclosure to individual ones of a second group of filamentary signal transmission elements entering said housing open enclosure;

a trough frame adapted for surrounding a plurality of said second group of filamentary signal transmission elements, the trough frame being a four-sided generally planar frame surrounding an open region with one of the sides of the frame having an opening for allowing a filamentary signal transmission element of said second group to be transversely inserted into or extracted from the open region;

a pair of channels in the periphery of the notch each adapted to receive a respective one of a pair of opposed sides of said trough frame adjacent to said frame one side so as to retain said trough frame in substantially coplanar relation to said at least one surrounding wall with said frame one side being exposed, so that said plurality of said second group of filamentary signal transmission elements terminated at said connector field can be guided by said trough frame to exit said housing through the notch in said at least one surrounding wall; and a cover securable to said housing surrounding walls for selectively closing off said open enclosure and said one side of a trough frame retained in a notch, so that when said cover is secured to said housing surrounding walls, said plurality of said second group of filamentary signal transmission elements are contained within said retain trough frame open region and preventing connection changes at said connector field.

2. The routing arrangement according to claim 1 further comprising:

a plate member having an outer periphery matching that of said trough frame;

whereby said plate member can be installed in a selected notch to close said selected notch in said at least one surrounding wall.

3. The routing arrangement according to claim 1 wherein said trough frame comprises:

a lower frame member;

a pair of side frame members secured to said lower frame member and extending orthogonally thereto in spaced relation to each other to bound said open region; and a pair of resilient upper frame members each secured to a respective one of said pair of side frame members and extending toward each other parallel to said lower frame member;

wherein the distal ends of said pair of upper frame members are separated by said opening having a minimum distance between said distal ends which is less than the thickness of an individual filamentary signal transmission element;

whereby said individual filamentary signal transmission element can be transversely inserted into or extracted from said open region by taking advantage of the resiliency of an upper frame member to increase said opening minimum distance.

4. The routing arrangement according to claim 1 wherein said trough frame comprises: a lower frame member;

a pair of side frame members secured to said lower frame member at opposite ends thereof and extending orthogonally thereto;

a central frame member secured to said lower frame member between said pair of side frame members and extending parallel to said side frame members;

a first resilient upper frame member secured at a central region to the distal end of said central frame member and extending parallel to said lower frame member to points approximately midway between said central frame member and said pair of side frame members; and second and third resilient upper frame members each secured to the distal end of a respective one of said pair of side frame members and extending parallel to said lower frame member substantially co-linear to said first upper frame member;

wherein the ends of said first upper frame member are spaced from the ends of respective ones of said second and third upper frame members to form two openings each having a minimum dimension which is less than the thickness of an individual filamentary signal transmission element;

whereby said individual filamentary signal transmission element can be transversely passed through a selected one of said two openings by taking advantage of the resiliency of one of said upper frame members to increase the minimum dimension of said selected one.

5. The routing arrangement according to claim 1 further comprising:

an exterior trough mountable to the outside of said housing, said exterior trough having a frame surrounding an open region, with the frame having an opening for allowing an individual filamentary signal transmission element to be transversely inserted into or extracted from said open region of said exterior trough.

6. The routing arrangement according to claim 1 wherein:

the connector field comprises a plurality of connector elements positioned along a line substantially parallel to one of said surrounding walls; and said at least one of said surrounding walls and the two adjacent ones of said surrounding walls are cut away so as to each have a respective three-sided open notch.

* * * * *